United States Patent [19]

Gelman

[11] 4,180,430

[45] Dec. 25, 1979

[54] ENVELOPE SEALING DEVICE

[76] Inventor: Charles S. Gelman, 1477 E. 10th St., Brooklyn, N.Y. 11230

[21] Appl. No.: 4,033

[22] Filed: Jan. 17, 1979

[51] Int. Cl.² .......................... B29H 9/00; B05C 11/00

[52] U.S. Cl. .................................. 156/441.5; 118/267

[58] Field of Search ...................... 156/441.5; 118/209, 118/267

[56] References Cited

U.S. PATENT DOCUMENTS

| | | | |
|---|---|---|---|
| 1,038,265 | 10/1912 | Baker | 118/209 |
| 1,996,289 | 4/1935 | Gilman | 118/209 |
| 2,074,811 | 3/1937 | Schuh | 118/209 |
| 2,425,251 | 8/1947 | Landau | 118/267 |

*Primary Examiner*—Douglas J. Drummond

*Attorney, Agent, or Firm*—Orville N. Greene; Frank L. Durr

[57] ABSTRACT

The sealing device is of the type that can be passed across an envelope to moisten the flap and then passed back to press the moistened flap against the envelope. The moistening pad is held between a lower base member and a cover so that only a small area of the pad is exposed to the elements. The lower base member is constructed so as to readily admit a starting portion of the flap into the area between the cover and the pad and means are provided on the pad to press the flap against the pad as the device is moved across the envelope. Water or moistening liquid is supplied to the pad from a chamber which serves as a holding means for the pad and the chamber is so constructed that water does not flow to the pad except when the device is in motion.

4 Claims, 5 Drawing Figures

ENVELOPE SEALING DEVICE

This invention relates to a device for sealing envelopes of the type which have a flap with adhesive thereon which must be moistened before sealing.

The customary way to seal such envelopes is to hold the flap open, moisten the adhesive thereon with the tongue and then press the flap back against the envelope. Some adhesives are distasteful and often the tongue or lips are cut by the edge of the flap. In any event, the sealing of numerous envelopes in this way is a diagreeable task. Thus, moistened sponges have been tried for wetting the adhesive, but the amount of moisture applied is usually too little or too much, since it depends on the pressure applied to the flap against the sponge and on the amount of water remaining in the sponge.

BACKGROUND OF THE INVENTION

This invention is an improvement on the Envelope Sealing Device disclosed in my U.S. Pat. No. 1,996,289 (Apr. 2, 1935), which discloses a device comprising a moistened felt pad held between two hinged plates which plates are held together by a screw when in use. Water is fed to the felt pad from a rubber bulb retained within a knob or handle for the device.

Another earlier envelope moistening device of Baker U.S. Pat. No. 1,038,265 shows a moistening pad to which moisture is fed from a chamber which is closed at the top by a cork. An air vent is provided to admit water to the pad from the closed chamber. A large part of the pad is exposed at the top surface and the device is designed essentially to move the envelope to be sealed with respect to the device which is maintained stationary.

Schuh U.S. Pat. No. 2,074,811 has disclosed a device for moistening envelopes wherein the device is moved with respect to the envelope to be moistened. The device which has a base 4, has a smooth form so that after an envelope flap has been moistened, it can be pressed down to complete the sealing, however, the bottom of the base is interrupted by a screw. The device is provided with a felt disk to hold the moisture for moistening. Almost the entire top surface of the felt disk is exposed to the atmosphere. A spring is provided for holding an envelope flap against the moistening felt disk.

Landau U.S. Pat. No. 2,425,251 discloses a moistening pad (exposed to the atmosphere), wherein a hollow tank feeds water to the pad when rotated in a particular way with respect to a cylindrical sleeve.

An object of the present invention is to provide an improved envelope sealing means of the type which is adapted to be moved relative to the envelope to wet the adhesive of the flap of the envelope and then moved with respect to the envelope to seal the moistened flap to the envelope.

Among other objects of the invention is to provide an envelope sealing device of simplified construction which is sanitary, easy to use, and which conserves its moisture content when not in use.

The objects of the invention are attained in an envelope sealing device consisting essentially of only three solid parts and a felt pad, a first part comprising a curvilinear base having a flat, uninterrupted lower surface, a peripheral rim around the upper portion adapted to hold a moistening pad and a threaded tubular projection within the rim; a second part comprising a disk or lid containing an opening fitting over the projection of the first part and a periphery which extends slightly beyond the edge of the rim of the first part; and a third part comprising a chamber with a threaded tubular extension which mates with the threaded tubular projection of the base. The pad is constructed with an opening to fit over the projection in the base. The chamber or third part is closed except for the opening of the tubular extension. The threaded tubular projection is provided with a shouldered portion to position the lid slightly above the pad and one or two openings into the pad area whereby water from the chamber will be fed to the pad by capillary attraction or in additional amounts when the device is moved horizontally; otherwise the chamber and tubular projection contains no air vent permitting flow of water when the device is at rest. The rim around the periphery of the curvilinear base has two depressed regions generally opposite one another, to permit an envelope flap to enter and exit between the lid and the moistening pad. The lid or disk contains a bead on an arcuate portion which extends between the two depressed regions of the rim of the base when the lid is in place over the pad. The bead presses the envelope flap against the moistening pad as the device is slid along the portion of the envelope below the flap. A detent or stud adapted to balance the side of the disk opposite the bead is provided, which also provides a stop limiting the rotation of the disk with respect to the base in one direction. Thus, the lid or disk can be rotated in one direction to expose the moistened pad for moistening stamps, for example, but ordinarily the entire top surface of the pad is protected against loss of moisture by vaporization and contamination by dust. The edge 16 of the base 10 takes the form of a smooth convex curve and presents a surface over which the edge of an envelope flap easily slips.

The pad may be made of flet, wick-like fabric, sponge, or any other suitable absorbent material which can be cut to fit the pad region provided within the rim of the base.

The three solid parts of the device can be made of plastic or metal, or one or more of the parts can be made of plastic and the other parts of metal. The base, which is the most complex of the three parts, is suitable for forming of plastic by injection or transfer molding, for example.

With the above and other advantageous features in view, the invention consists of a novel arrangement of parts more fully disclosed in the detailed description following, in conjunction with the accompanying drawing, and more particularly defined in the claims appended hereto.

Figure 2:
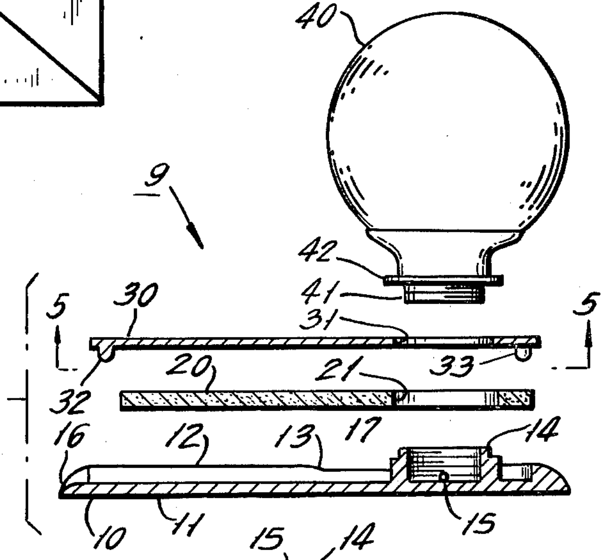
FIG. 2 is a side cross-sectional exploded view of the device.
Figure 3:
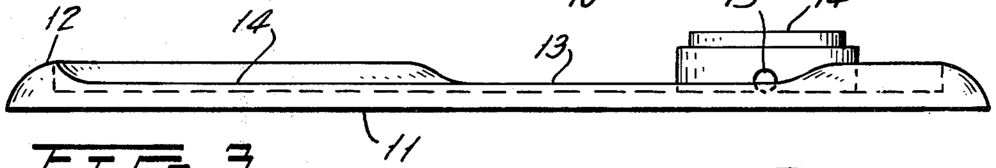
FIG. 3 is a side view of the base of the device on an enlarged scale as seen in the direction of the arrow in FIG. 4.

As shown in the exploded view of FIG. 2, the device of the invention comprises a base 10, a moistening pad 20, a lid or disk 30 and a chamber 40. The base 10 has a smooth flat bottom surface 11 so as to slide easily over the surface of an envelope. The base is shown as being circular in shape, but it can also be elliptical, oval or of other, less regular, curvilinear shape. Extending upwardly from the periphery of the base, is a rim forming a basin which is adapted to be substantially completely filled by the moistening pad 20. The rim 12 has two depressions 13 and 14, on opposite sides of that line, which extends through the diameter of the projection 14 and the center of the base. Although said depressions are on opposite sides of said line, they are not necessarily symmetrically placed with respect to said line.

The tubular projection 14 is shown as being threaded on the inside, but it can be threaded on the outside instead. Near the lower end of the projection 14 are one or two small holes 15, 15' opening to the region occupied by the pad 20. The projection 14 also contains a shouldered portion 16 on which the cover 30 rests.

Figure 1:
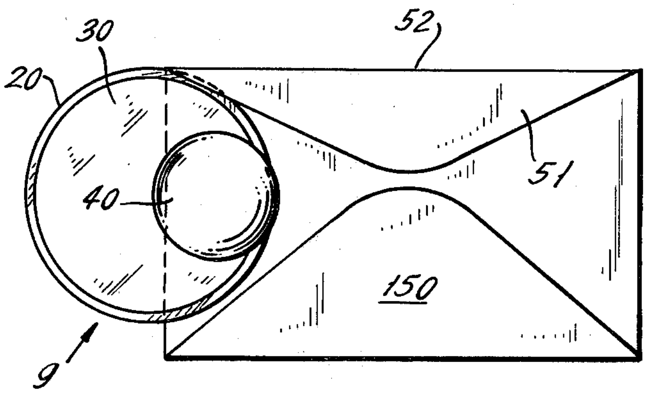
FIG. 1 is an illustration of how the device of the invention is used to moisten an envelope flap.
Figure 5:
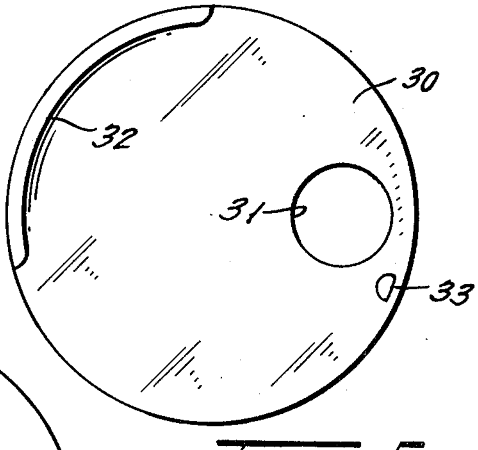
FIG. 5 is a bottom view of the disk or top portion of the device.
Figure 4:
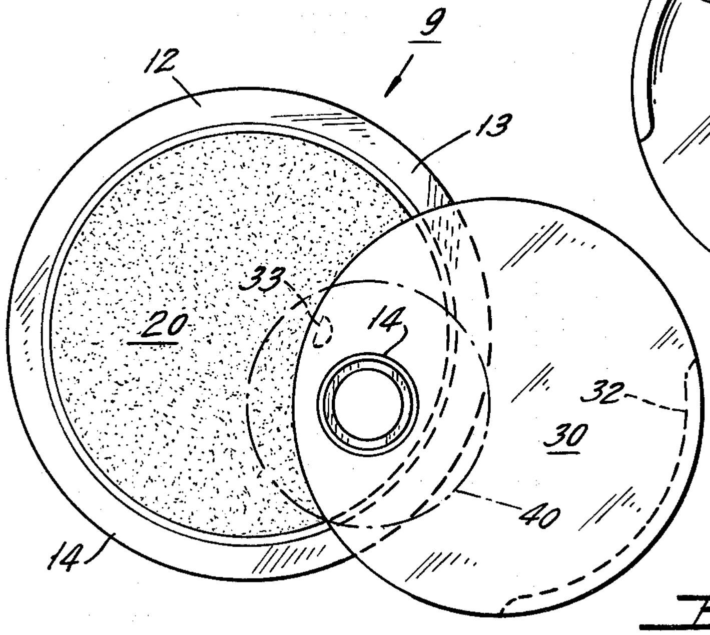
FIG. 4 is a top plan view of the device with the chamber removed.

An essential feature of the lid or disk 30 is that it contains the opening 31 to fit over the projection 14, a lip 32 (see FIG. 5), to press an edge region of a flap of an envelope against the pad 20, and a stud 33. When the chamber 40 is tightened into the projection 14 with the disk 30 therebetween the lid 30 is held substantially parallel to the place of the base 10 but the forward edge, adjacent the lip 32, is slightly raised above the pad to easily admit the flap of an envelope. Stud 33 is also so placed that when chamber part 40 is partly unscrewed, the disk 30 can be rotated about projection 14 in a counter-clockwise direction as shown in FIG. 4 to present a moistened surface for moistening stamps, but when the cover is rotated back to the cover position as shown in FIG. 1, the stud 33 prevents the cap from being rotated beyond the covering positions.

The chamber 40 may have any decorative outer shape, such as that of a sphere, as shown, or it may have an outward appearance of an animal or other decorative object. The chamber must be hollow as shown and be liquid tight so as to hold water or another moistening agent. The length of the threaded tubular end 41 of the chamber 40 is such as to not completely cover or seal the opening 15 of the projection 14 when the chamber 40 is screwed tightly into projection 14 to unite the parts of the device. The threaded tubular end 41 and the threaded projection 14 constitute the entire means for assembling the parts of the device. The circular flange 42 of the chamber 40 serves to hold the cover or lid 30 tightly over the pad 20 and on the shoulder 17.

The pad 20 has an opening 21 therein so that it fits flat within the region formed by the rim 12 of the base.

In operation, an envelope 50, having a flap 51 which is normally angled slightly upwardly from its fold 52, does not require any preparation but is held in position by pressing the device 9 against the lower region of the envelope. The device 9 is then slid upwardly and to the left as shown in FIG. 1, whereupon an edge of the flap 51, guided by edge 16 of base 10, enters into the space between lid 30 and pad 20 through the depressed area 13 of the rim 12. As the device 9 is further moved to the right as shown in FIG. 1, the lip 32 presses the glue containing portion of the flap 51 against the pad 20 to wet it. When the device 9 is slid off of the envelope, it is brought backwardly in the same manner over the top of the envelope to press the moistened flap and seal the envelope. With a little practice, a series of envelopes can be quickly sealed by the device.

I claim:

1. An envelope sealing device of the type adapted to be moved across an unsealed envelope to moisten the flap of the envelope and then moved back over the flap to press the flap into sealing engagement with the remainder of the envelope consisting of a moistening pad and three assembled parts, a first of said parts being a base portion having curvilinear shape, a smooth uninterrupted bottom, a peripheral rim extending upwardly from the bottom providing a thin chamber adapted to hold a moistening pad, a threaded tubular projection extending upwardly from said chamber and containing a small orifice connecting the interior of said tubular projection to the thin chamber, said peripheral rim being connected to the periphery of the bottom by a smooth convex curvilinear surface and said rim containing two opposed smoothly curved depressions therein, said moistening pad having a shape and thickness approximately matching the shape and depth of the thin chamber formed by the rim of the first part and containing an opening therein adapted to fit over the threaded tubular projection in said chamber, the second of said parts consisting of a cover means adapted to fit over and cover the moistening pad, said cover means containing an opening adapted to fit over the projecting tubular portion to aid in positioning the cover over the moistening pad, said cover also containing a downwardly extending arcuate bead in the area between the two opposed depressions of said rim where the cover is in place over the pad, said cover also containing a downwardly extending stud in the area opposite the bead to limit rotation of the cover with respect to the tubular projection in one direction when the cover is not pressed against said pad, said third part comprising a decorative outer surface with an internal hollow chamber and a threaded tubular projecting portion adapted to match the threads of said projection from the base, said hollow chamber being closed except for the opening to said tubular projection, said chamber part being adapted to press against said cover part when screwed onto said tubular projection, the length of said tubular projection being adjusted and arranged so as to leave the orifice in said tubular projection open to the hollow chamber.

2. The envelope sealing device as claimed in claim 1 wherein at least one of said three parts of the device is made of plastic.

3. The envelope sealing device as claimed in claim 1 wherein the tubular projection from said base contains a shouldered portion on which the periphery of the opening in said cover is adapted to rest.

4. The envelope sealing device as claimed in claim 1, wherein the tubular projection from said base is internally threaded and the tubular projection from the hollow chamber part is externally threaded.

* * * * *